(12) United States Patent
Imakura et al.

(10) Patent No.: US 11,934,558 B2
(45) Date of Patent: Mar. 19, 2024

(54) DISTRIBUTED DATA INTEGRATION DEVICE, DISTRIBUTED DATA INTEGRATION METHOD, AND PROGRAM

(71) Applicant: University of Tsukuba, Ibaraki (JP)

(72) Inventors: Akira Imakura, Tsukuba (JP); Tetsuya Sakurai, Tsukuba (JP)

(73) Assignee: University of Tsukuba, Ibaraki (JP)

( * ) Notice: Subject to any disclaimer, the term of this patent is extended or adjusted under 35 U.S.C. 154(b) by 359 days.

(21) Appl. No.: 17/309,845

(22) PCT Filed: Dec. 18, 2019

(86) PCT No.: PCT/JP2019/049551
§ 371 (c)(1),
(2) Date: Jun. 23, 2021

(87) PCT Pub. No.: WO2020/137728
PCT Pub. Date: Jul. 2, 2020

(65) Prior Publication Data
US 2022/0075898 A1    Mar. 10, 2022

(30) Foreign Application Priority Data

Dec. 26, 2018  (JP) ................. 2018-243376

(51) Int. Cl.
*G06F 21/62*    (2013.01)
*G06V 30/414*   (2022.01)

(52) U.S. Cl.
CPC ...... *G06F 21/6254* (2013.01); *G06F 21/6227* (2013.01); *G06V 30/414* (2022.01)

(58) Field of Classification Search
CPC ............ G06F 21/6254; G06F 21/6227; G06V 30/414
See application file for complete search history.

(56) References Cited

U.S. PATENT DOCUMENTS 10,037,437 B1 *  7/2018  Kenthapadi ............. G06F 17/18
10,262,154 B1 *  4/2019  Kenthapadi ......... G06F 21/6227
(Continued)

FOREIGN PATENT DOCUMENTS

EP    3561697 A1    10/2019
JP    2014095931 A   5/2014
(Continued)

OTHER PUBLICATIONS

InnovationQ NPL Search (Year: 2023).*
(Continued)

*Primary Examiner* — Samson B Lemma
*Assistant Examiner* — Richard W Cruz-Franqui
(74) *Attorney, Agent, or Firm* — Schwegman Lundberg & Woessner, P.A.

(57) ABSTRACT

A distributed data integration device includes an acquisition unit configured to acquire, for a piece of analysis target data, an anchor data intermediate representation and an analysis target intermediate representation, the anchor data intermediate representation being an intermediate representation obtained by converting anchor data by a first function, the anchor data being data commonly used in integration of a plurality of the pieces of analysis target data that are distributed, the analysis target intermediate representation being an intermediate representation obtained by converting the analysis target data by the first function, an anchor data conversion unit configured to convert, for the piece of analysis target data, a plurality of the anchor data intermediate representations by a second function, a calculation unit configured to calculate, for the piece of analysis target data, the second function that minimizes a difference between the plurality of the anchor data intermediate representations, and an analysis target data conversion unit configured to convert,
(Continued)

for the piece of analysis target data, the analysis target intermediate representation by the second function.

5 Claims, 11 Drawing Sheets

(56) References Cited

U.S. PATENT DOCUMENTS

| | | | |
|---|---|---|---|
| 2003/0210820 A1* | 11/2003 | Lachner | G06T 7/74 382/209 |
| 2006/0059179 A1* | 3/2006 | Asano | H04L 9/0869 |
| 2009/0018407 A1* | 1/2009 | Jung | A61B 3/113 705/2 |
| 2017/0293772 A1* | 10/2017 | Chen | G06F 21/6227 |
| 2020/0004981 A1* | 1/2020 | Miyaji | G06Q 50/22 |
| 2020/0034520 A1* | 1/2020 | Kim | G06N 3/04 |
| 2020/0327252 A1* | 10/2020 | Mcfall | G06F 21/78 |
| 2021/0035347 A1* | 2/2021 | Casas Guix | G06T 13/40 |

FOREIGN PATENT DOCUMENTS

| | | |
|---|---|---|
| JP | 2016027391 A | 2/2016 |
| WO | WO-2014010202 A1 | 1/2014 |
| WO | WO-2018124104 A1 | 7/2018 |

OTHER PUBLICATIONS

NPL History Search (Year: 2023).*
"International Application Serial No. PCT/JP2019/049551, International Search Report dated Feb. 10, 2020", w/ English Translation, (Feb. 10, 2020), 5 pgs.
"International Application Serial No. PCT/JP2019/049551, Written Opinion dated Feb. 10, 2020", (dated Feb. 10, 2020), 3 pgs.

* cited by examiner

DISTRIBUTED DATA INTEGRATION DEVICE, DISTRIBUTED DATA INTEGRATION METHOD, AND PROGRAM

PRIORITY APPLICATIONS

This application is a U.S. National Stage Filing under 35 U.S.C. § 371 from International Application No. PCT/JP2019/049551, filed on Dec. 18, 2019, and published as WO2020/137728 on Jul. 2, 2020, which claims the benefit of priority to Japanese Application No. 2018-243376, filed on Dec. 26, 2018; the benefit of priority of each of which is hereby claimed herein, and which applications and publication are hereby incorporated herein by reference in their entirety.

TECHNICAL FIELD

The present invention relates to a distributed data integration device, a distributed data integration method, and a program.

The present application claims priority to JP 2018-243376 filed in Japan on Dec. 26, 2018, the contents of which are incorporated herein by reference.

BACKGROUND ART

In a case in which distributed pieces of data are integrated and analyzed, either the original data including confidential information or the original data which is exceedingly large may not be able to be shared and analyzed. For example, medical data including personal information of patients cannot generally be provided by medical institutions, so the original data cannot be shared.

One known example of a technique for analyzing distributed pieces of data including confidential information is a data analysis device that discloses and analyzes data that can be disclosed while protecting data to be hidden such as medical information, and performs data communication of resultant information between persons, institutions, and the like having different access levels (PTL 1).

PTL 1: JP 2014-095931 A

CITATION LIST

Patent Literature

SUMMARY OF INVENTION

Technical Problem

In the data analysis device described in PTL 1, data that can be disclosed is disclosed and analyzed, and thus only the data that can be disclosed can be analyzed. In the data analysis device described in PTL 1, integrated analysis cannot be performed on a plurality of pieces of data stored in a distributed manner without sharing the pieces of data.

The present invention is made in light of the circumstances described above, and provides a distributed data integration device, a distributed data integration method, and a program that enable integrated analysis on a plurality of pieces of data stored in a distributed manner without sharing the pieces of data.

Solution to Problem

The present invention is made in order to solve the problem described above, and an aspect of the present invention is a distributed data integration device including an acquisition unit configured to acquire, for a piece of analysis target data, an anchor data intermediate representation and an analysis target intermediate representation, the anchor data intermediate representation being an intermediate representation obtained by converting anchor data by a first function, the anchor data being data commonly used in integration of a plurality of the pieces of analysis target data that are distributed, the analysis target intermediate representation being an intermediate representation obtained by converting the piece of analysis target data by the first function, an anchor data conversion unit configured to convert, for the piece of analysis target data, a plurality of the anchor data intermediate representations acquired by the acquisition unit by a second function, a calculation unit configured to calculate, for the piece of analysis target data, the second function that minimizes a difference between the plurality of the anchor data intermediate representations converted by the anchor data conversion unit, and an analysis target data conversion unit configured to convert, for the piece of analysis target data, the analysis target intermediate representation acquired by the acquisition unit by the second function calculated by the calculation unit.

In an aspect of the present invention, in the distributed data integration device, the first function is a function for abstracting data.

In an aspect of the present invention, in the distributed data integration device, attributes included in the anchor data include all of attributes included in the plurality of the pieces of analysis target data.

An aspect of the present invention is a distributed data integration method including acquiring, for a piece of analysis target data, an anchor data intermediate representation and an analysis target intermediate representation, the anchor data intermediate representation being an intermediate representation obtained by converting anchor data by a first function, the anchor data being data commonly used in integration of a plurality of the pieces of analysis target data that are distributed, the analysis target intermediate representation being an intermediate representation obtained by converting the piece of analysis target data by the first function, converting, for the piece of analysis target data, a plurality of the anchor data intermediate representations acquired in the acquiring by a second function, calculating, for the piece of analysis target data, the second function that minimizes a difference between the plurality of the anchor data intermediate representations converted in the converting, and converting, for the piece of analysis target data, the analysis target intermediate representation acquired in the acquiring by the second function calculated in the calculating.

An aspect of the present invention is a program for causing a computer to perform acquiring, for a piece of analysis target data, an anchor data intermediate representation and an analysis target intermediate representation, the anchor data intermediate representation being an intermediate representation obtained by converting anchor data by a first function, the anchor data being data commonly used in integration of a plurality of the pieces of analysis target data that are distributed, the analysis target intermediate representation being an intermediate representation obtained by converting the piece of analysis target data by the first function, converting, for the piece of analysis target data, a plurality of the anchor data intermediate representations acquired in the acquiring by a second function, calculating, for the piece of analysis target data, the second function that minimizes a difference between the plurality of the anchor data intermediate representations converted in the converting, and converting, for the piece of analysis target data, the analysis target intermediate representation acquired in the acquiring by the second function calculated in the calculating.

Advantageous Effects of Invention

According to the present invention, integrated analysis can be performed on a plurality of pieces of data stored in a distributed manner without sharing the pieces of data.

DESCRIPTION OF EMBODIMENTS

Embodiment

Overview of Integrated Data Analysis IA

Figure 1:
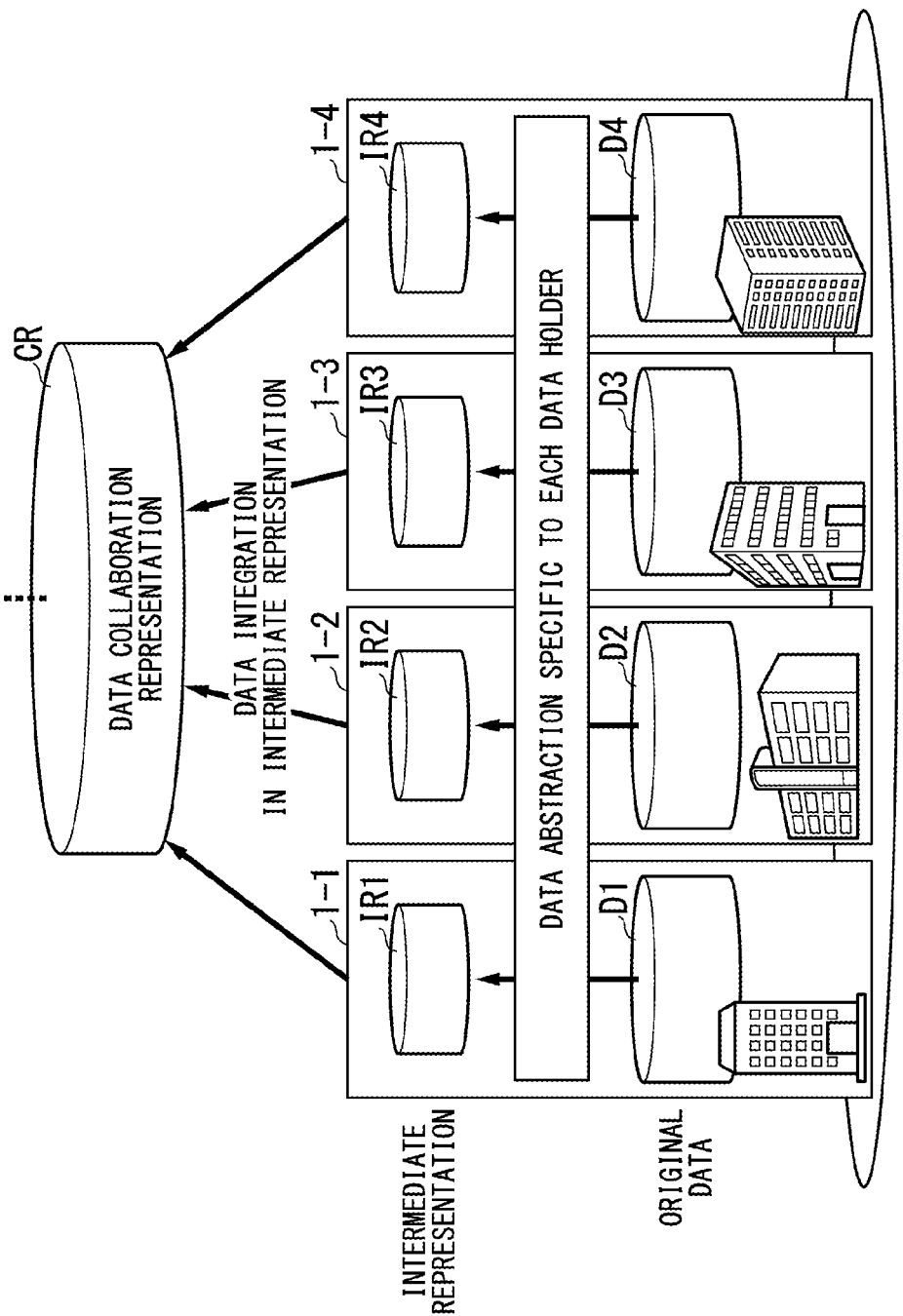
FIG. 1 is a diagram illustrating an example of an overview of an integrated data analysis system according to an embodiment of the present invention.

An embodiment of the present invention will be described below in detail with reference to the drawings. FIG. 1 is a diagram illustrating an example of an overview of an integrated data analysis system SS according to the present embodiment.

Original data D1 to D4 are data to be analyzed in the integrated data analysis system SS. The original data D1 to D4 are an example of a plurality of pieces of analysis target data. The original data D1 to D4 are stored in servers 1-1 to 1-4, respectively, in a distributed manner. The servers 1-1 to 1-4 are, for example, servers of medical institutions. The original data D1 to D4 are, for example, medical data including confidential information such as personal information of patients.

The server 1-1 abstracts the original data D1 by a specific method, and converts the original data D1 into original data intermediate representation IR1. The original data D2 to D4 are similarly converted in the servers 1-2 to 1-4 into original data intermediate representations IR2 to IR4, respectively, by their own specific methods. The method of abstraction is not shared between the servers 1-1 to 1-4. In other words, in the integrated data analysis IA, in a case in which distributed data is integrated to be analyzed, prescribed standardization is not performed.

The original data intermediate representations IR1 to IR4 are converted into data collaboration representation CR by integration. In the integrated data analysis IA, analysis of the data collaboration representation CR is performed. Thus, in the integrated data analysis system SS, the original data D1 to D4 being distributed data are converted into the original data intermediate representations IR1 to IR4, and are then integrated as the data collaboration representation CR to be analyzed, and the original data D1 to D4 are not shared.

Configuration of Distributed Data Integration Device 2

Figure 2:
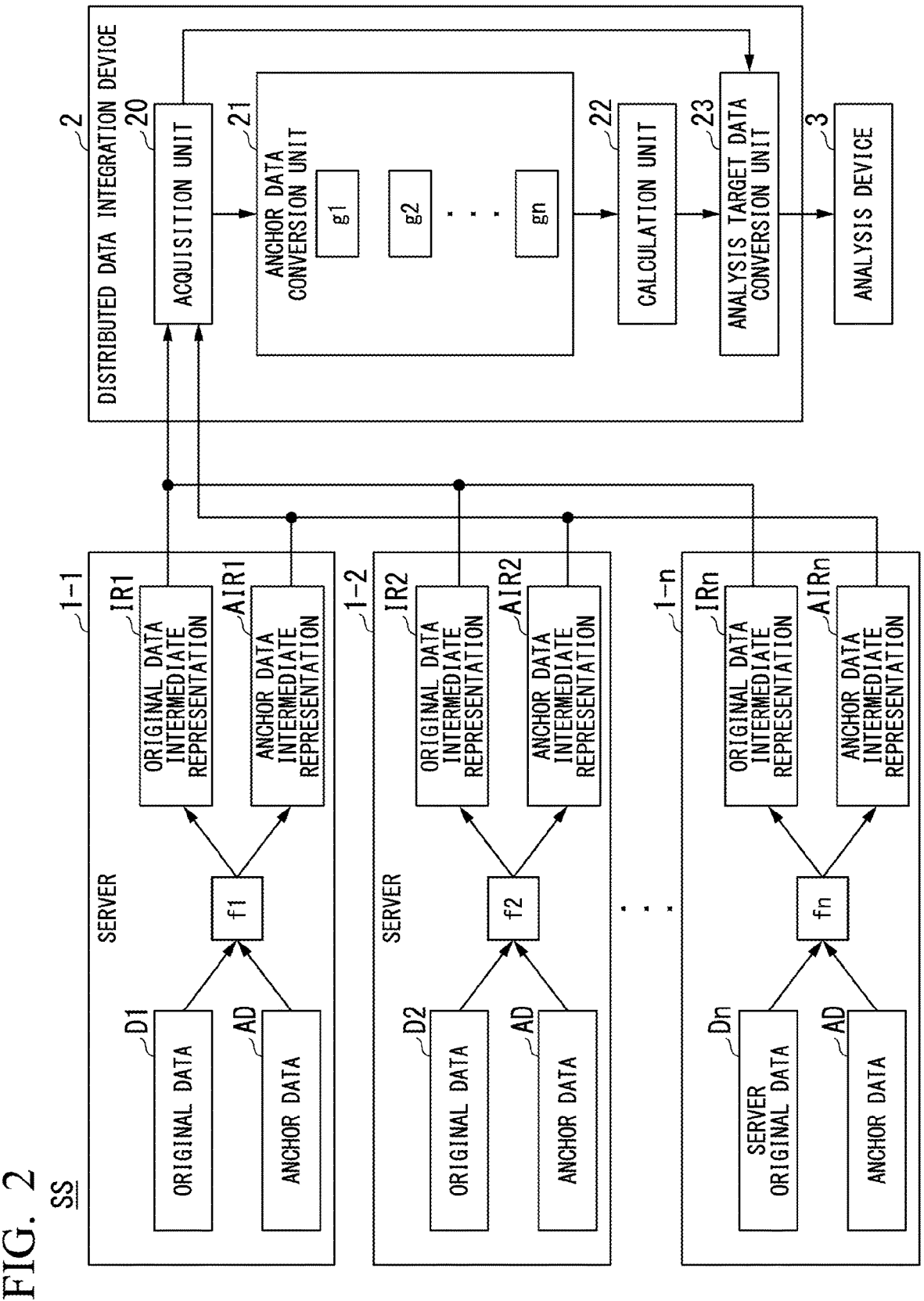
FIG. 2 is a diagram illustrating an example of a configuration of the integrated data analysis system according to the embodiment of the present invention.

FIG. 2 is a diagram illustrating an example of a configuration of the integrated data analysis system SS according to the present embodiment.

The integrated data analysis system SS includes servers 1-$i$ ($i=1, 2, \ldots, n$: n is the number of pieces of original data), a distributed data integration device 2, and an analysis device 3. Note that the term "servers 1-$i$" ($i=1, 2, \ldots, n$: n is the number of pieces of original data) or the like may be hereinafter simply referred to as "servers 1-1 to 1-$n$" or the like.

The servers 1-1 to 1-$n$ are provided with common anchor data AD in advance. The anchor data AD is provided, for example, from the distributed data integration device 2. The anchor data AD is data that is commonly used in integration of the distributed original data D1 to Dn. In the anchor data AD, confidential information is not included.

It is preferable that the anchor data AD be data close the original data D1 to Dn, from the perspective of accuracy of analysis of the integrated data analysis IA. The anchor data AD being data close to the original data D1 to Dn means that, for example, a numerical value range is common to the anchor data AD and the original data D1 to Dn. The anchor data AD being data close to the original data D1 to Dn means that, for example, the attributes included in the anchor data AD include all of the attributes included in the original data D1 to Dn. The value of each piece of data of the anchor data AD is, for example, a value to be randomly generated.

Here, the servers 1-1 to 1-$n$ each have a similar function, and thus the server 1-1 will be taken as a representative example to describe the functions of the servers 1-1 to 1-$n$.

The server 1-1 converts the original data D1 into the original data intermediate representation IR1 by a first function f1. The first function f1 is a linear or non-linear function that abstracts the original data D1. Here, the abstraction is, for example, executed by means of principal component analysis (PCA), locality preserving projection (LPP), T-distributed stochastic neighbor embedding (t-SNE), and the like, which are unsupervised dimensionality reduction methods, linear discriminant analysis (fisher discriminant analysis (FDA)), local FDA (LFDA), semi-supervised LFDA (SELF), and the like, which are supervised dimensionality reduction methods, a non-linear dimensionality reduction method in which a non-linear kernel version is used for the above methods, an autoencoder used in a deep neural network, and the like. Note that the server 1-1 may remove confidential information from the original data D1, and then convert the original data D1 from which the confidential information has been removed into the original data intermediate representation IR1.

The original data intermediate representation IR1 is an example of an analysis target intermediate representation, which is an intermediate representation obtained through conversion of the analysis target data by the first function.

The server 1-1 converts the anchor data AD that is provided to the server itself in advance into an anchor data intermediate representation AIR1 by the first function f1. The first function f1 is identical to the function used to convert the original data D1 into the original data intermediate representation IR1.

The distributed data integration device 2 is a device that integrates original data intermediate representations IR1 to IRn into the data collaboration representation CR. The distributed data integration device 2 includes an acquisition unit 20, an anchor data conversion unit 21, a calculation unit 22, and an analysis target data conversion unit 23.

The acquisition unit 20 acquires anchor data intermediate representations AIR1 to AIRn from the servers 1-1 to 1-$n$, respectively. The acquisition unit 20 acquires the original data intermediate representations IR1 to IRn from the servers 1-1 to 1-$n$, respectively.

The anchor data conversion unit 21 converts the anchor data intermediate representations AIR1 to AIRn acquired by the acquisition unit 20 by linear or non-linear second functions g1 to gn, respectively. The pieces of data obtained by conversion of the anchor data intermediate representations AIR1 to AIRn by the second functions g1 to gn are referred to as converted data G1 to Gn.

The calculation unit 22 calculates the second functions g1 to gn that minimize differences between the converted data G1 to Gn being the anchor data intermediate representations converted by the anchor data conversion unit 21.

In other words, the calculation unit 22 calculates the second functions g1 to gn so that the converted data G1 to Gn become close to each other, the converted data G1 to Gn resulting from conversion of the anchor data intermediate representations AIR1 to AIRn by the second functions g1 to gn.

Here, the calculation unit 22 calculates the second functions g1 to gn by, for example, solving a minimization problem. In particular, when the second functions g1 to gn are linear functions, the minimization problem corresponds to a generalized total least squares problem.

Note that it is preferable that a predetermined or greater number of pieces of the distributed original data D1 to Dn be used from the viewpoint of accuracy in solving a minimization problem.

The analysis target data conversion unit 23 converts the original data intermediate representations IR1 to IRn acquired by the acquisition unit 20 by the second functions g1 to gn calculated by the calculation unit 22, respectively. The results obtained by the conversion are referred to as data collaboration representations CR1 to CRn.

The analysis device 3 integrates the data collaboration representations CR1 to CRn obtained by the distributed data integration device 2 and analyzes the integrated data, with respect to the original data D1 to Dn. The analysis device 3 analyzes the integrated data collaboration representations CR1 to CRn by, for example, machine learning such as the Kernel LSPC (least squares probabilistic classifier) method and a deep neural network.

Specific Example of Each Piece of Data

Figure 3:
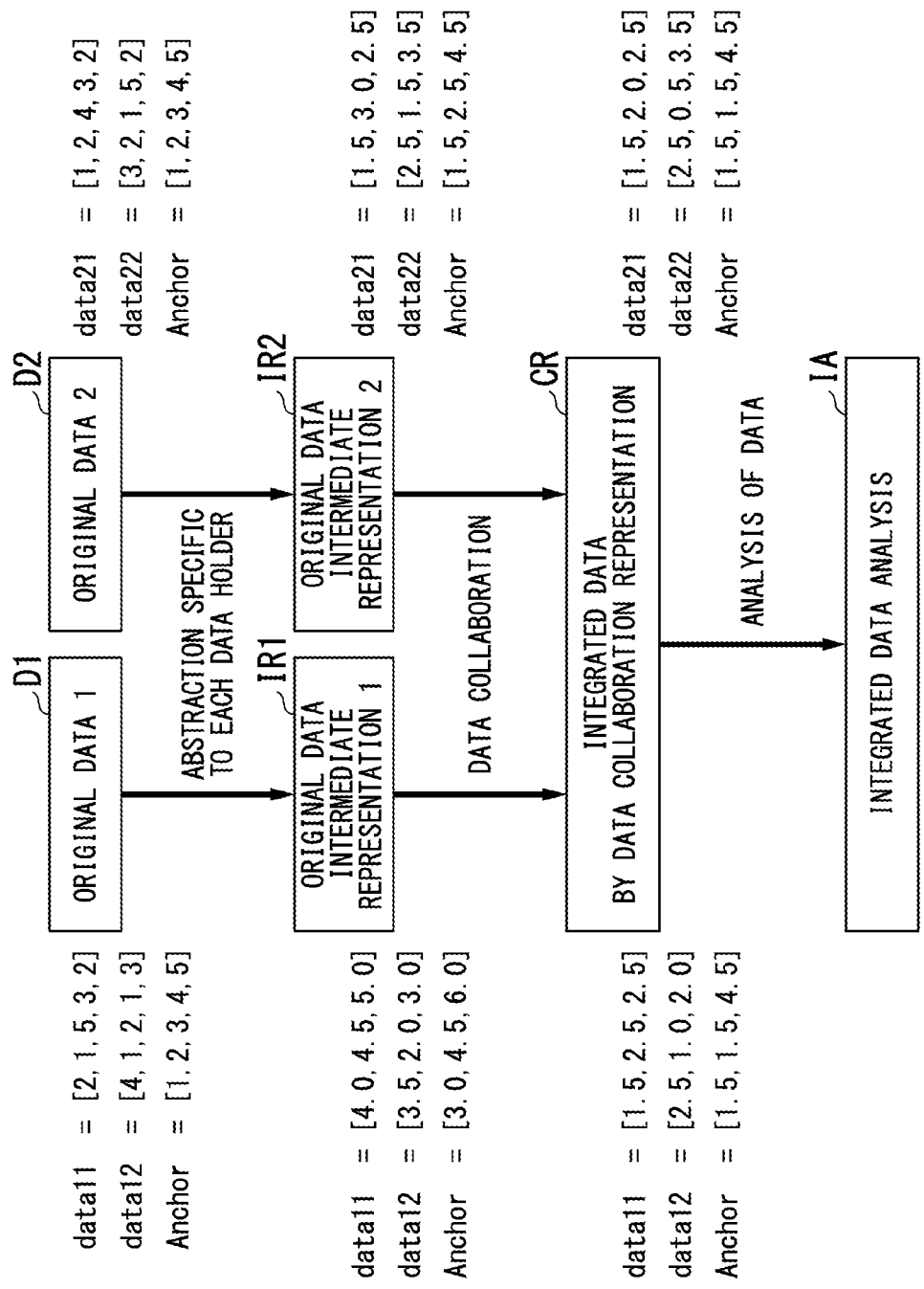
FIG. 3 is a diagram illustrating an example of each piece of data according to the embodiment of the present invention.

FIG. 3 is a diagram illustrating an example of each piece of data according to the present embodiment. FIG. 3 is an example of a case in which there are two pieces of distributed analysis target data, namely the original data D1 and the original data D2.

The original data D1 includes five-dimensional data data11 and data data12. The component of the data data11 is [2, 1, 5, 3, 2], and the component of the data data12 is [4, 1, 2, 1, 3]. The original data D2 includes five-dimensional data data21 and data data22. The component of the data data21 is [1, 2, 4, 3, 2], and the component of the data data22 is [3, 2, 1, 5, 2].

The component of the anchor data AD being five-dimensional data is [1, 2, 3, 4, 5].

As described above, the original data D1, the original data D2, and the anchor data AD are abstracted for each of the server 1-1 and the server 1-2 by their own specific methods. As a result of the abstraction, the data data11 and the data data12 are converted into three-dimensional data [4.0, 4.5, 5.0] and [3.5, 2.0, 3.0] being the original data intermediate representation IR1. The anchor data AD provided to the server 1-1 is converted into three-dimensional data [3.0, 4.5, 6.0] being the anchor data intermediate representation AIR1.

Meanwhile, as a result of the abstraction, the data data21 and the data data22 are converted into three-dimensional data [1.5, 3.0, 2.5] and [2.5, 1.5, 3.5] being the original data intermediate representation IR2. The anchor data AD provided to the server 1-2 is converted into three-dimensional data [1.5, 2.5, 4.5] being the anchor data intermediate representation AIR2.

The original data intermediate representations IR1 to IR2 and the anchor data intermediate representations AIR1 to AIR2 are converted into the data collaboration representations CR1 to CR2 by the distributed data integration device 2. The original data D1 (the data data11 and the data data12) is converted into three-dimensional data [1.5, 2.5, 2.5] and "2.5, 1.0, 2.0" being the data collaboration representation CR1. The anchor data intermediate representation AIR1 is converted into three-dimensional data [1.5, 1.5, 4.5] as the converted data G1.

Meanwhile, the original data D2 (the data data21 and the data data22) is converted into three-dimensional data [1.5, 2.0, 2.5] and "2.5, 0.5, 3.5" being the data collaboration representation CR2. The anchor data intermediate representation AIR2 is converted into the three-dimensional data [1.5, 1.5, 4.5] as the converted data G2.

Here, the anchor data intermediate representation AIR1 obtained by being abstracted in the server 1-1 and the anchor data intermediate representation AIR2 obtained by being abstracted in the server 1-2 are both converted into the three-dimensional data [1.5, 1.5, 4.5] as the converted data G1 and the converted data G2 in the distributed data integration device 2. In the distributed data integration device 2, the second functions g1 to gn that minimize the differences between the converted data G1 to Gn being obtained from the anchor data intermediate representations AIR1 to AIRn are calculated, and thus the differences between the converted data G1 and the converted data G2 are minimized.

In the integrated data analysis IA, the three-dimensional data [1.5, 2.5, 2.5] and "2.5, 1.0, 2.0" being the data collaboration representation CR1 and the three-dimensional data [1.5, 2.0, 2.5] and "2.5, 0.5, 3.5" being the data collaboration representation CR2 are integrated, and analysis is performed.

Note that the present embodiment describes a case in which, as a result of conversion through abstraction, dimensionality of data of the original data D1 to Dn is reduced in the original data intermediate representations IR1 to IRn in comparison with the original data D1 to Dn, but not limited thereto. The abstraction may be conversion in which, as a result of the conversion, dimensionality of data is the same as that of the original data D1 to Dn in the original data intermediate representations IR1 to IRn.

The conversion for obtaining the original data intermediate representations IR1 to IRn is not limited to abstraction. For example, the conversion for obtaining the original data intermediate representations IR1 to IRn may be conversion for increasing the dimensionality of the original data D1 to Dn.

Note that the dimensionality of the original data intermediate representations IR1 to IRn and the anchor data intermediate representations AIR1 to AIRn may be different for each piece of data. Excessive reduction of the dimensionality of these intermediate representations is not preferable because this may cause excessive deterioration of information included in the original data D1 to Dn.

Note that the conversion for obtaining the original data intermediate representations IR1 to IRn may be trivial conversion that does not change contents of the original data D1 to Dn. Note that, if the conversion for obtaining the original data intermediate representations IR1 to IRn is such trivial conversion, the original data D1 to Dn are provided to the distributed data integration device 2 without any change, and thus it is preferable that confidential information be removed from the original data D1 to Dn before the conversion.

Processing of Distributed Data Integration Device 2

Figure 4:
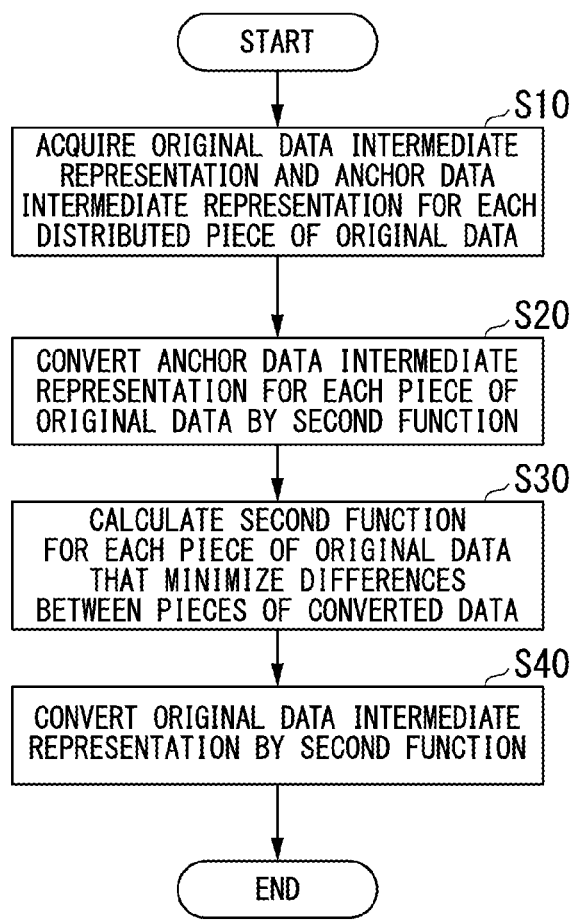
FIG. 4 is a diagram illustrating an example of processing of a distributed data integration device according to the embodiment of the present invention.

FIG. 4 is a diagram illustrating an example of processing of the distributed data integration device 2 according to the present embodiment.

As an example, the present embodiment deals with a classification problem in which types of leukemia are classified into three classes by use of gene expression data. In the classification problem, 38 pieces of training data are divided into two sets, and are stored in the server 1-1 and the server 1-2 as the original data D1 and the original data D2, respectively. Here, in the training data, a plurality of types of features related to the gene expression data and types of leukemia are associated with each other for each sample.

In the following description of FIG. 4, the number "n" is two.

Each of the original data D1 to Dn is 7129-dimensional data. The original data D1 to Dn are converted into the original data intermediate representations IR1 to IRn being 17-dimensional data through abstraction by the Kernel LPP (locality preserving projection) method in the servers 1-1 to 1-$n$, respectively. Here, in the Kernel LPP method, different conversions are employed depending on data to be converted. The original data D1 to Dn are generally different from each other, and thus the conversions of the Kernel LPP method are different from each other for each of the servers 1-1 to 1-$n$.

The anchor data AD provided to each of the servers 1-1 to 1-$n$ is data that is common to the servers 1-1 to 1-$n$ and is randomly generated. In the servers 1-1 to 1-$n$, the anchor data AD is converted into the anchor data intermediate representations AIR1 to AIRn by the Kernel LPP method.

Step S10: The acquisition unit 20 acquires the original data intermediate representations IR1 to IRn and the anchor data intermediate representations AIR1 to AIRn for each piece of the distributed original data D1 to Dn. The acquisition unit 20 provides the acquired anchor data intermediate representations AIR1 to AIRn to the anchor data conversion unit 21. The acquisition unit 20 provides the acquired original data intermediate representations IR1 to IRn to the analysis target data conversion unit 23.

Here, the anchor data intermediate representations AIR1 to AIRn are intermediate representations that are obtained through conversion of the anchor data AD by the first functions f1 to fn. The original data intermediate representations IR1 to IRn are analysis target intermediate representations that are intermediate representations obtained through conversion of analysis target data (in this example, the original data D1 to Dn) by the first functions f1 to fn.

In other words, the acquisition unit 20 acquires, for each piece of analysis target data, the anchor data intermediate representations AIR1 to AIRn being the intermediate representations that are obtained through conversion of the anchor data being data commonly used in integration of a plurality of distributed pieces of analysis target data by the first functions f1 to fn, and the analysis target intermediate representations (in this example, the original data intermediate representations IR1 to IRn) being the intermediate representations that are obtained through conversion of the pieces of analysis target data (in this example, the original data D1 to Dn) by the first functions f1 to fn.

Step S20: The anchor data conversion unit 21 converts the plurality of anchor data intermediate representations AIR1 to AIRn acquired by the acquisition unit 20 for each piece of the original data D1 to Dn by the second functions g1 to gn. The anchor data conversion unit 21 provides the converted data G1 to Gn obtained through conversion of the anchor data intermediate representations AIR1 to AIRn to the calculation unit 22.

Step S30: The calculation unit 22 calculates the second functions g1 to gn for respective pieces of the original data D1 to Dn that minimize differences between the converted data G1 to Gn converted by the anchor data conversion unit 21.

In other words, the calculation unit 22 calculates the second functions g1 to gn for respective pieces of the original data D1 to Dn that minimize differences between the anchor data intermediate representations AIR1 to AIRn converted by the anchor data conversion unit 21.

Here, in the present embodiment, as an example, each processing of Step S20 and Step S30 corresponds to processing of solving a generalized total least squares problem. In the processing, each processing of Step S20 and Step S30 may be repeated until the second functions g1 to gn for respective pieces of the original data D1 to Dn that minimize differences between the anchor data intermediate representations AIR1 to AIRn are calculated.

The calculation unit 22 provides the calculated second functions g1 to gn to the analysis target data conversion unit 23.

Step S40: The analysis target data conversion unit 23 converts the original data intermediate representations IR1 to IRn acquired by the acquisition unit 20 into the data collaboration representations CR1 to CRn by the second functions g1 to gn, each being calculated as a solution of a generalized total least squares problem by the calculation unit 22.

In other words, the analysis target data conversion unit 23 converts the analysis target intermediate representations acquired by the acquisition unit 20 for each piece of analysis target data by the second functions g1 to gn calculated by the calculation unit 22.

The analysis target data conversion unit 23 provides the data collaboration representations CR1 to CRn obtained through the conversion to the analysis device 3.

In the analysis device 3, the data collaboration representations CR1 to CRn provided by the distributed data integration device 2 are integrated, and the integrated data analysis IA is performed. The analysis device 3 performs the integrated data analysis IA by, for example, the Kernel LSPC method.

Here, with reference to FIG. 5, a first specific example of results of the integrated data analysis IA will be described. In the following description of the first specific example, the integrated data analysis IA is referred to as integrated data analysis IA1.

Figure 5:
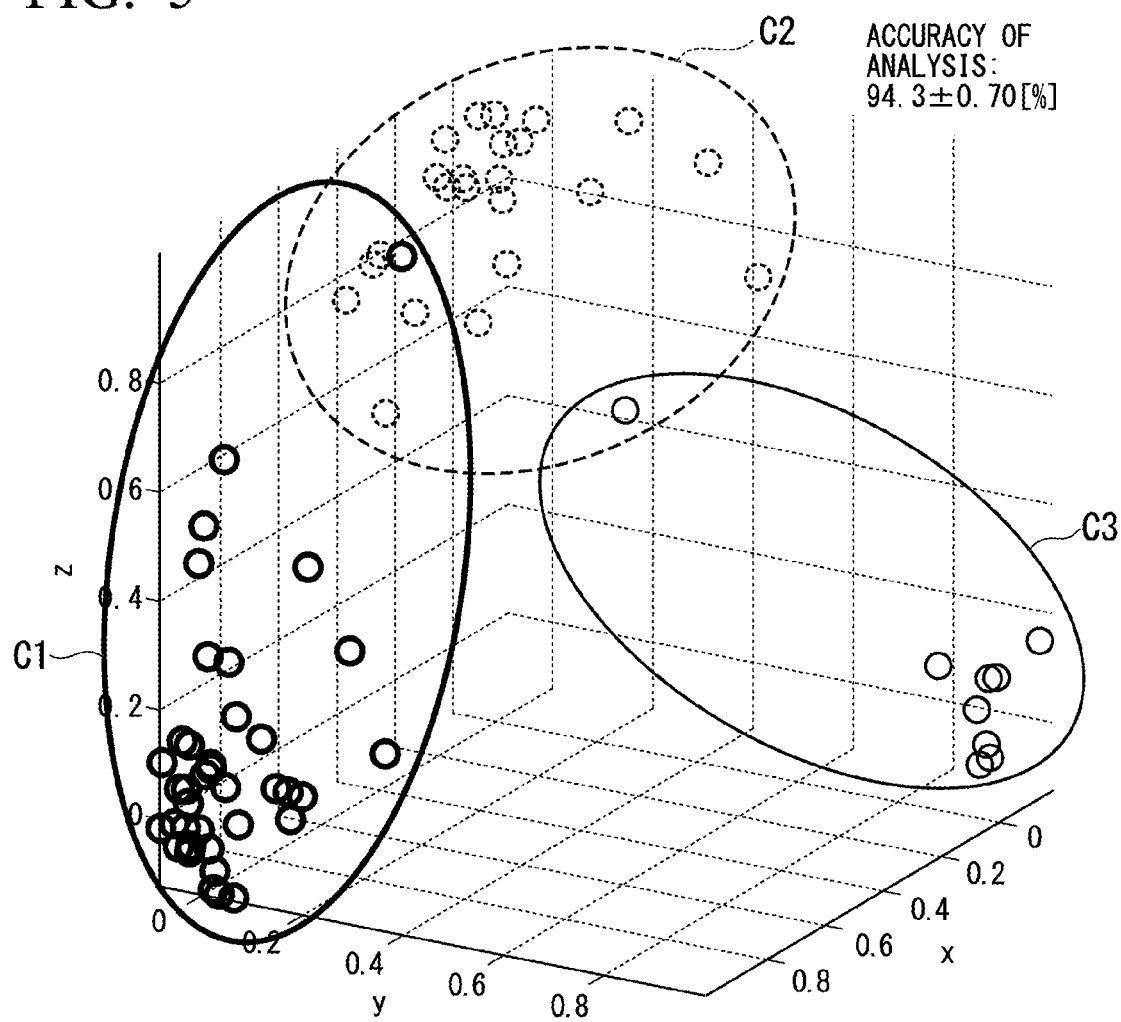
FIG. 5 is a diagram showing an example of results of integrated data analysis according to the embodiment of the present invention.

FIG. 5 is a diagram showing an example of results of the integrated data analysis IA1 according to the present embodiment. In FIG. 5, pieces of data for each sample are illustrated in a three-dimensional space that indicates three types of features out of a plurality of types of features related to gene expression data. Classes C1 to C3 correspond to types of leukemia, and the pieces of data for each sample are classified according to the types of leukemia. The pieces of data included in the classes C1 to C3 and less overlapped with each other have higher accuracy of analysis.

In the integrated data analysis IA1, pieces of training data distributed into two were integrated by the integrated data analysis IA according to the present embodiment to be used as training data, and the Kernel LSPC method was performed. As a result, the types of leukemia were able to be classified into three classes C1 to C3 with accuracy of 94.3±0.70 percent.

In order to obtain analysis results shown in FIG. 5, in the integrated data analysis IA1, as the first function for abstraction of data, kernel version locality preserving projection is used as an example. Here, the Gaussian kernel is used as the kernel of the kernel version locality preserving projection. In the integrated data analysis IA1, in order to calculate the second functions that minimize differences between the anchor data intermediate representations, a solution method based on singular value decomposition is used as an example.

Here, the locality preserving projection (LPP) used as the first function will be described. LPP is an unsupervised dimensionality reduction method, and in LPP, a low-dimensional space that preserves a local structure is constructed. Preserving a local structure means that pieces of data having a close distance to each other in the original data before LPP is executed have a close distance to each other in the low-dimensional space constructed by LPP. In LPP, a projection function depending on the original data is constructed, and thus generated functions are different for each piece of data to be distributed (for example, in medical institutions or the like).

LPP is formulated as expressed in Expression (1).

[Math. 1]

$$\min_B \sum_{ij} w_{ij} \| B^T(x_i - x_j) \|_2^2 + \text{ORTHOLOGY CONDITION FOR } B \quad (1)$$

$x_i$ and $x_j$ represent values of the original data being values of features. A matrix B is a matrix indicating LPP. A weight $w_{ij}$ represents a degree of similarity between $x_i$ and $x_j$ shown in Equation (2).

[Math. 2]

$$w_{ij} = \exp\left(-\frac{\| x_i - x_j \|_2^2}{\sigma^2}\right) \quad (2)$$

The value of the weight $w_{ij}$ becomes larger as the distance between pieces of data becomes closer in the pieces of original data. Note that, practically, the value of the weight $w_{ij}$ is made sparse through the k-nearest neighbor algorithm, and $w_{ij}=0$ is applied to pieces of data having a sufficiently large distance between the pieces of data in the pieces of original data.

Conventional Integrated Data Analysis IA0

Here, with reference to FIG. 6 and FIG. 7, integrated data analysis IA0 using integrated data SD0 according to conventional standardization will be described, for the sake of comparison with the integrated data analysis IA1 according to the present embodiment.

Figure 6:
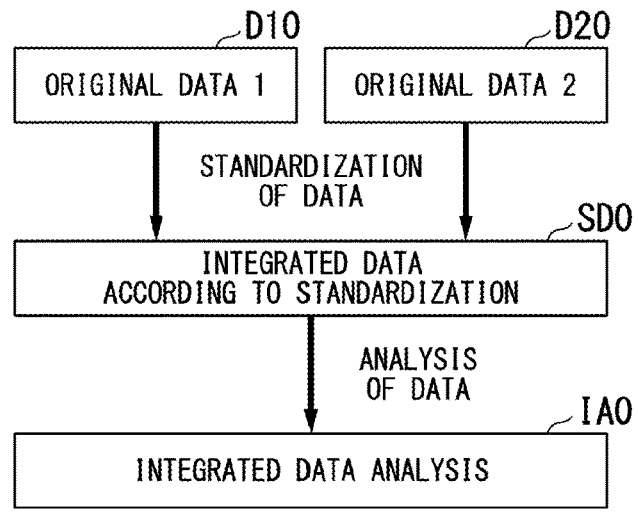
FIG. 6 is a diagram illustrating an example of integrated data analysis using integrated data according to existing standardization.

FIG. 6 is a diagram illustrating an example of the integrated data analysis IA0 using the integrated data SD0 according to conventional standardization. Distributed original data D10 and original data D20 are converted in respective servers according to prescribed standardization. The original data D10 and the original data D20 converted according to the standardization are integrated as integrated data SD0 according to the standardization. The integrated data SD0 according to the standardization is analyzed by the integrated data analysis IA0.

Figure 7:
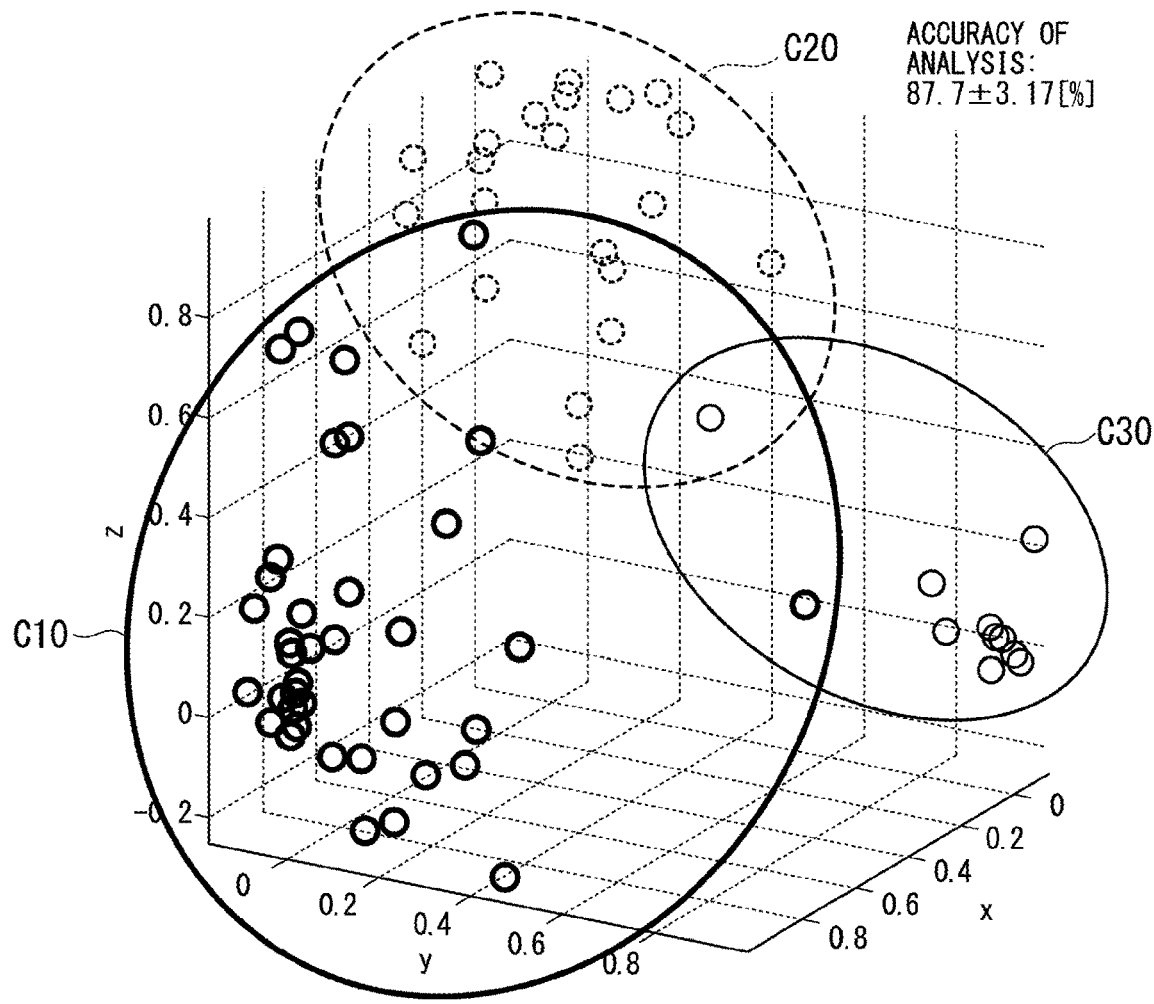
FIG. 7 is a diagram showing an example of analysis results of a case in which pieces of original data are not integrated.

FIG. 7 is a diagram showing an example of analysis results of a case in which pieces of original data are not integrated. Classes C10 to C30 correspond to types of leukemia. As a result of performing the Kernel LSPC method using one piece of data out of the pieces of training data distributed into two sets, the types of leukemia are classified into three classes C1 to C3 with accuracy of 87.7±3.17 percent.

The comparison between the accuracy of analysis of the integrated data analysis IA1 according to the present embodiment of FIG. 5 and the analysis accuracy of the Kernel LSPC method using one piece of data out of the pieces of training data distributed into two shows that the analysis accuracy of the integrated data analysis IA1 according to the present embodiment is higher than the analysis accuracy of the Kernel LSPC method using one piece of data out of the pieces of training data distributed into two.

Next, with reference to FIG. 8 to FIG. 9, a second specific example of results of the integrated data analysis IA will be described. In the following description of the second specific example, the integrated data analysis IA is referred to as integrated data analysis IA2. In the integrated data analysis IA2, a problem of separating a space into a plurality of regions corresponding to a plurality of types of points based on distribution of the plurality of types of points is analyzed based on machine learning.

The space refers to a space indicating ten types of features, and dimensionality of the space is ten dimensions. Note that, in the examples shown in FIG. 8 to FIG. 9, values are randomly set by random numbers for eight types out of the ten types of features, and the training data and the analysis results are shown in the plane corresponding to the rest of two types.

The machine learning is the Kernel LSPC method as an example. Note that, as the machine learning, any method of machine learning may be used as long as the method uses supervised learning.

Figure 8:
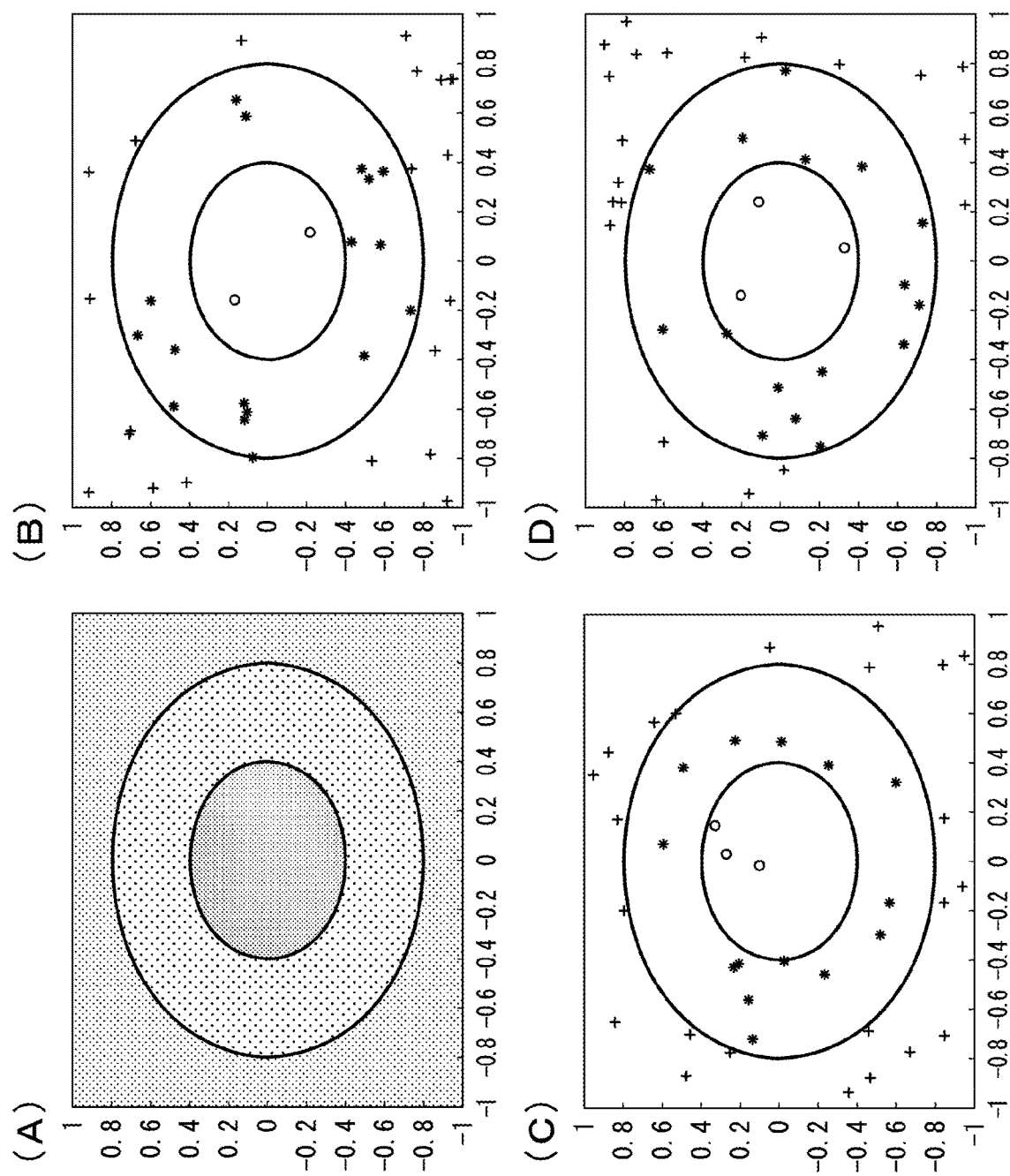
FIG. 8 is a diagram illustrating an example of ground truth data and training data used for machine learning according to the embodiment of the present invention.

FIG. 8 is a diagram illustrating an example of ground truth data and training data used for machine learning according to the present embodiment. FIG. 8(A) illustrates the ground truth data, and FIGS. 8(B), (C), and (D) each illustrate the training data.

In FIG. 8(A), the plane is divided into three regions, and a ground truth of how the regions are divided in the problem of dividing the plane into regions is illustrated. In the training data illustrated in FIGS. 8(B), (C), and (D), distribution of a plurality of points belonging to any one of the three regions in the plane is shown with closed curves that denote boundaries between the regions of the ground truth. Here, the distribution of the plurality of points is shown using different symbols according to the regions to which the points belong. The number of the plurality of points is 40 in each of FIGS. 8(B), (C), and (D). The training data illustrated in FIGS. 8(B), (C), and (D) correspond to a plurality of distributed pieces of analysis target data.

Figure 9:
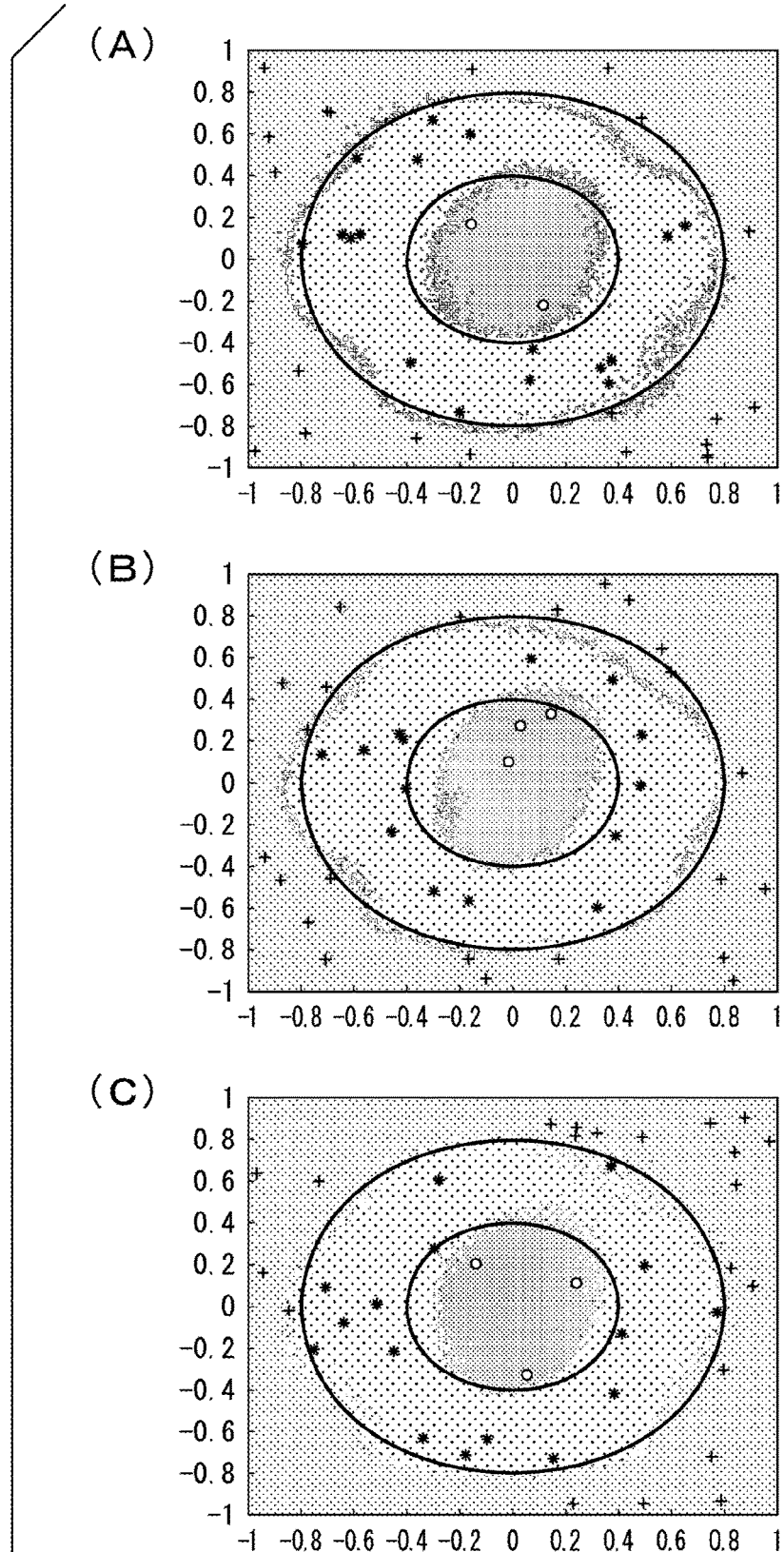
FIG. 9 is a diagram showing an example of results of integrated data analysis according to the embodiment of the present invention.

FIG. 9 is a diagram showing an example of results of the integrated data analysis IA2 according to the present embodiment. FIGS. 9(A), (B), and (C) show results of the integrated data analysis IA2 in a case in which the distribution of the plurality of points shown in FIGS. 8(B), (C), and (D) is respectively used as pieces of training data.

In order to obtain analysis results shown in FIG. 9, in the integrated data analysis IA2, as the first function for abstraction of data, kernel version locality preserving projection is used as an example. Here, the Gaussian kernel is used as the kernel of the kernel version locality preserving projection. In the integrated data analysis IA2, in order to calculate the second functions that minimize differences between the anchor data intermediate representations, a solution method based on singular value decomposition is used as an example.

Figure 10:
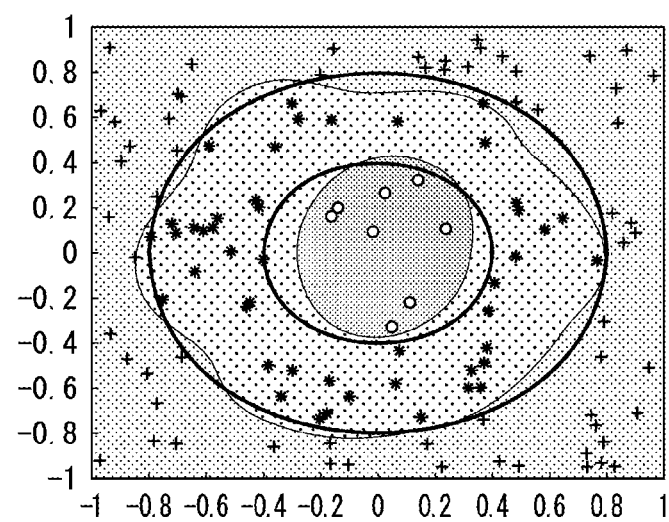
FIG. 10 is a diagram showing an example of results of integrated data analysis using integrated data according to existing standardization.

For the sake of comparison with the results of the integrated data analysis IA2, FIG. 10 shows analysis results of a case in which distributed pieces of training data are integrated according to conventional standardization and are used. FIG. 10 shows results of a case in which analysis by means of machine learning is executed with the training data shown in FIGS. 8(B), (C), and (D) being shared between holders of the data and being used as one set of training data.

Figure 11:
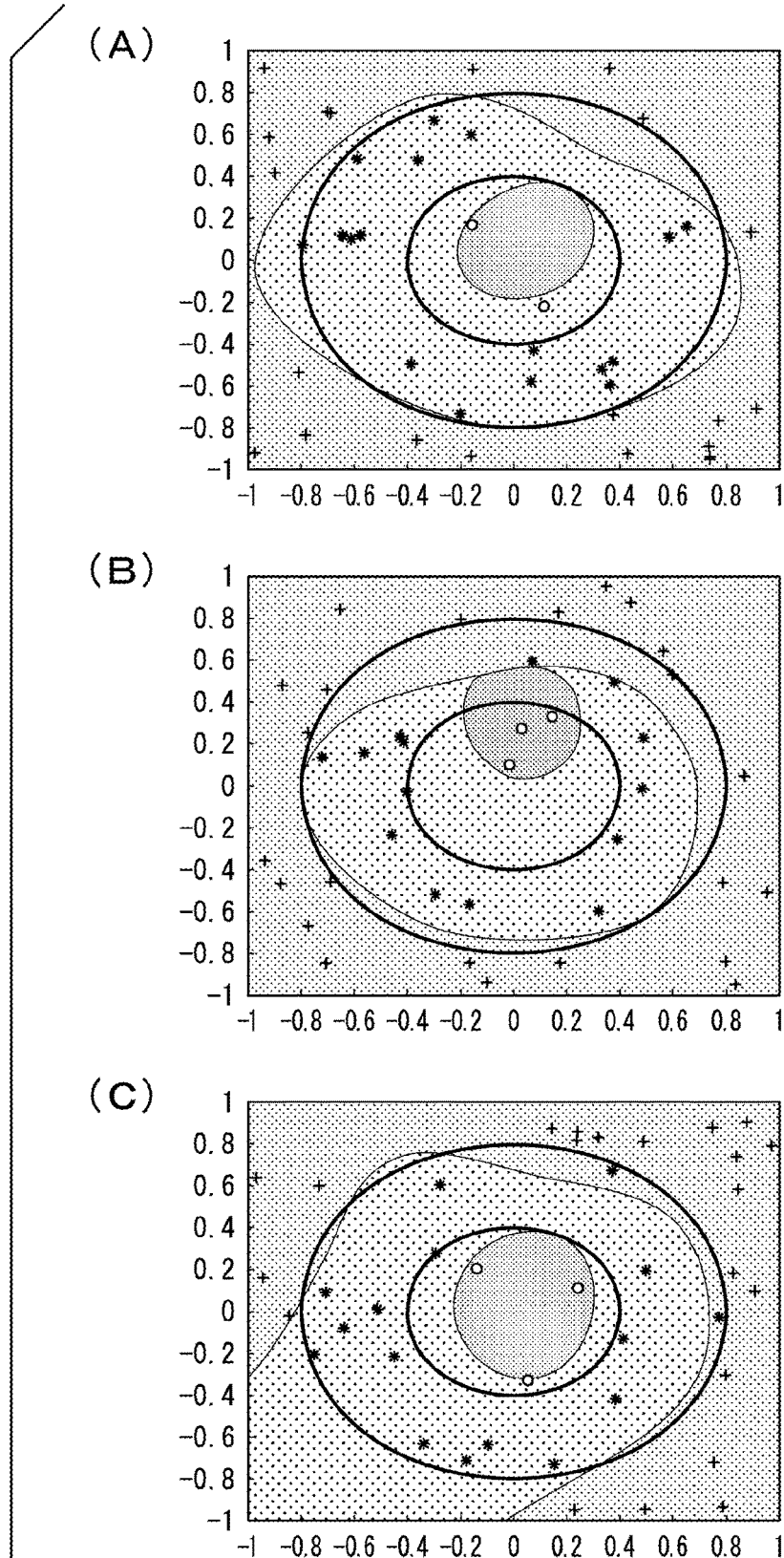
FIG. 11 is a diagram showing an example of results of analysis of an existing case in which distributed pieces of training data are individually used.

FIG. 11 shows analysis results of a case in which distributed pieces of training data are individually used. FIGS. 11(A), (B), and (C) show results of a case in which analysis by means of machine learning is executed with the training data shown in FIGS. 8(B), (C), and (D) being respectively individually used.

The comparison between the analysis results obtained with the integrated data analysis IA2 shown in FIG. 9, the analysis results of the case in which the pieces of training data shown in FIG. 10 are integrated and used, and the analysis results of the case in which the distributed pieces of training data shown in FIG. 11 are individually used shows that the analysis results obtained with the integrated data analysis IA2 are close to the analysis results of the case in which the distributed pieces of training data are shared between holders of the data, in comparison with the analysis results of the case in which the distributed pieces of training data are individually used. In other words, in the analysis results obtained with the integrated data analysis IA2, high accuracy of determination is obtained in comparison with the analysis results of the case in which the distributed pieces of training data are individually used.

Next, with reference to FIG. 12, a third specific example of results of the integrated data analysis IA will be described. In the following description of the third specific example, the integrated data analysis IA is referred to as integrated data analysis IA3. In the integrated data analysis I3A, recognition of handwritten digits is executed based on machine learning. The machine learning is the Kernel LSPC method as an example. Note that, as the machine learning, any method of machine learning may be used as long as the method uses supervised learning.

Figure 12:
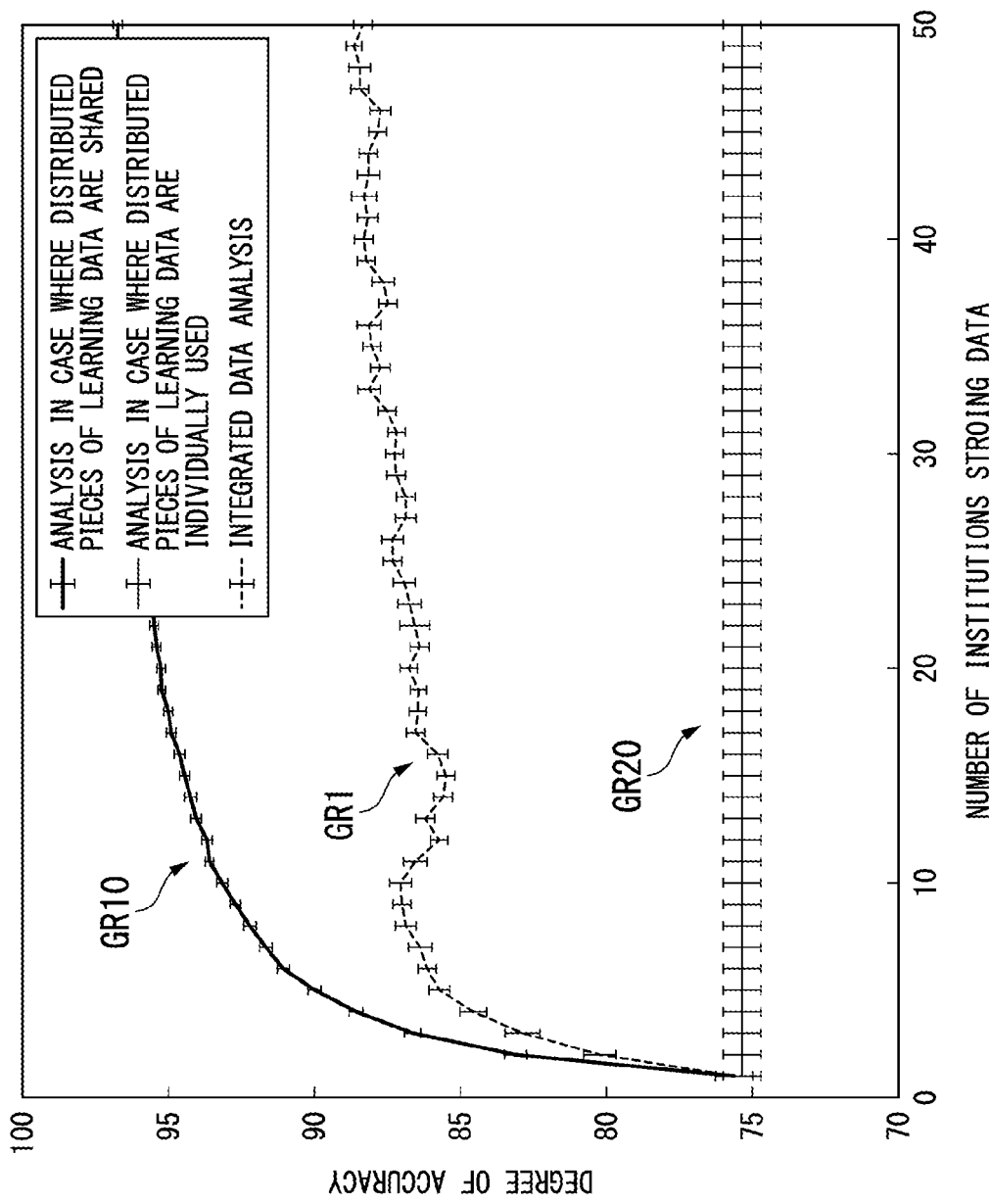
FIG. 12 is a diagram showing an example of degrees of accuracy of results of integrated data analysis according to the embodiment of the present invention.

FIG. 12 is a diagram showing an example of degrees of accuracy of the results of the integrated data analysis IA3 according to the present embodiment. FIG. 12 shows a graph GR1, a graph GR10, and a graph GR20, each showing degrees of accuracy of the analysis results of a case in which the number of distributed pieces of training data is changed from 1 to 50. The graph GR1 shows analysis results obtained by the integrated data analysis IA3. The graph GR10 and the graph GR20 are graphs of the analysis results obtained with conventional analysis for the sake of comparison with the integrated data analysis IA3. The graph GR10 shows a degree of accuracy of analysis results in a case in which the distributed pieces of training data are integrated and analysis is performed. The graph GR20 shows a degree of accuracy of analysis results of a case in which the distributed pieces of training data are individually used. In the analysis corresponding to the graph GR20, the number itself of distributed pieces of training data used for learning is one, and the piece of data used for learning among the distributed pieces of training data is changed.

Regarding the distributed pieces of training data, 100 pieces of data form one set as an example. The number of distributed pieces of training data corresponds to the number of institutions storing the pieces of data. In other words, in the integrated data analysis IA3, a situation in which the institutions storing the data each stores 100 pieces of data is assumed. In the integrated data analysis IA3, Modified National Institute of Standards and Technology (MNIST) is used as the training data. The training data includes 784 features, which corresponds to the number of pixels of an image consisting of 28 pixels in each of vertical and horizontal directions.

In order to obtain analysis results shown in FIG. 12, in the integrated data analysis IA3, as the first function for abstraction of data, kernel version locality preserving projection is used as an example. Here, the Gaussian kernel is used as the kernel of the kernel version locality preserving projection. In the integrated data analysis IA3, in order to calculate the second functions that minimize differences between the anchor data intermediate representations, a solution method based on singular value decomposition is used as an example.

As shown in FIG. 12, the degree of accuracy shown by the graph GR1 is higher than the degree of accuracy shown by the graph GR20 and is close to the degree of accuracy shown by the graph GR10, in comparison with the degree of accuracy shown by the graph GR20. In other words, in the analysis results obtained by the integrated data analysis IA3, high accuracy of determination is obtained in comparison with the analysis results of the case in which the distributed pieces of training data are individually used.

SUMMARY

As described above, the distributed data integration device 2 according to the present embodiment includes the acquisition unit 20, the anchor data conversion unit 21, the calculation unit 22, and the analysis target data conversion unit 23.

In other words, the acquisition unit 20 acquires, for each piece of analysis target data (in this example, the original data D1 to Dn), the anchor data intermediate representations AIR1 to AIRn being the intermediate representations that are obtained through conversion of the anchor data AD being data commonly used in integration of a plurality of distributed pieces of analysis target data (in this example, the original data D1 to Dn) by the first functions f1 to fn, and the analysis target intermediate representations (in this example, the original data intermediate representations IR1 to IRn) being the intermediate representations that are obtained through conversion of the pieces of analysis target data (in this example, the original data D1 to Dn) by the first functions f1 to fn.

This configuration allows the distributed data integration device 2 according to the present embodiment to convert the intermediate representations into the data collaboration representation CR. Therefore, integrated analysis can be performed on a plurality of pieces of data stored in a distributed manner without sharing the pieces of data.

With medical data such as the gene expression data taken as an example in the present embodiment, sharing of original data for each medical institution is difficult from the viewpoint of hiding information. There is a great demand for integrated analysis on various pieces of development data stored by companies in the manufacturing industry, as well as the medical data; however, integration of original data is difficult from the viewpoint of confidentiality. From the viewpoint other than hiding information, integration of data is also difficult when the original data is exceedingly large. It is expected that the integrated data analysis IA in which the original data is not shared according to the distributed data integration device 2 of the present embodiment can be applied to various fields, such as medical institutions and the manufacturing industry.

As described above, when distributed data includes confidential information, there is an existing method of deleting the confidential information and integrating and analyzing original data using standardization.

In the integrated analysis of the distributed data using existing standardization, necessary data needs to be standardized in consideration of an analysis target. Standardization is difficult when there is a large number of types of original data and when there is a wide variety of analysis purposes. It is assumed that the types of original data will be increased or there will be a new analysis purpose in the future, which will make standardization more and more difficult.

In the integrated analysis of the distributed data using existing standardization, all the holders of the distributed data need to convert the original data, based on a standard standardized in advance. The costs required in standardization and conversion of the original data will become greater as the types of original data or the size of the original data such as big data increases.

In the distributed data integration device 2 according to the present embodiment, the intermediate representations changed by holders of the distributed data through abstraction specific to each of the holders can be converted into the data collaboration representation CR, and therefore the costs required in standardization in advance and conversion of the original data into a standard can be reduced.

In the distributed data integration device 2 according to the present embodiment, the first functions f1 to fn are functions of abstracting data.

This configuration allows the distributed data integration device 2 according to the present embodiment to abstract pieces of original data stored in a distributed manner, and therefore integrated analysis can be performed on a plurality of pieces of data stored in a distributed manner by abstraction without sharing the pieces of data.

In the distributed data integration device 2 according to the present embodiment, the attributes included in the anchor data AD include all of the attributes included in a plurality of pieces of analysis target data (in this example, the original data D1 to Dn).

This configuration allows the distributed data integration device 2 according to the present embodiment to increase the accuracy of the integrated data analysis IA as compared to a case in which the attributes included in the anchor data AD do not include all of the attributes included in the plurality of pieces of analysis target data (in this example, the original data D1 to Dn).

Note that a part of the distributed data integration device 2 according to the embodiment described above, for example, the acquisition unit 20, the anchor data conversion unit 21, the calculation unit 22, and the analysis target data conversion unit 23, may be implemented by a computer. In that case, this may be implemented by recording a program for implementing such a control function in a computer-readable recording medium, and causing a computer system to read and execute the program recorded in the recording medium. Note that the "computer system" mentioned herein includes an OS and hardware such as peripheral equipment, which serve as a computer system incorporated in the acquisition unit 20. The "computer-readable recording medium" includes a portable medium such as a flexible disk, a magneto-optical disk, a ROM, and a CD-ROM, and a storage device such as a hard disk incorporated in the computer system. In addition, the "computer-readable recording medium" may include a recording medium that dynamically stores a program for a short period of time, such as a communication line when the program is transmitted via a network such as the Internet and a communication line such as a telephone line, and a recording medium that stores a program for a fixed period of time, such as a volatile memory inside a computer system that serves as a server or a client in the above-mentioned case. Further, the program may be a program for implementing a part of the functions described above, or may be a program that can implement the above-described functions in combination with the program that is already recorded in the computer system.

A part or all of the distributed data integration device 2 according to the embodiments described above may be implemented as an integrated circuit of large-scale integration (LSI) or the like. Each functional block of the distributed data integration device 2 may be individually implemented as a processor, or a part or all thereof may be integrated and implemented as a processor. The method for implementation as an integrated circuit is not limited to LSI, and implementation may be achieved with a dedicated circuit or a general-purpose processor. If a technology for implementation as an integrated circuit to replace LSI is developed as a result of improvement of semiconductor technology, an integrated circuit according to the technology may be used.

While one embodiment of the present invention has been described above in detail with reference to the drawings, specific configurations are not limited to those described above, and various changes to design or the like may be made within the scope that does not depart from the gist of the present invention.

REFERENCE SIGNS LIST

SS Integrated data analysis system
1-1 to 1-*n* Server
2 Distributed data integration device
20 Acquisition unit
21 Anchor data conversion unit
22 Calculation unit
23 Analysis target data conversion unit
3 Analysis device
D1 to Dn Original data
AD Anchor data
f1 to fn First function
g1 to gn Second function
IR1 to IRn Original data intermediate representation
AIR1 to AIRn Anchor data intermediate representation

The invention claimed is:

1. A distributed data integration device, comprising:
a memory;
a computer connected to the memory and that:
acquires, for a piece of analysis target data, an anchor data intermediate representation and an analysis target intermediate representation, the anchor data intermediate representation being an intermediate representation obtained by converting anchor data by a first function, the anchor data being data commonly used in integration of a plurality of the pieces of analysis target data that are distributed, the analysis target intermediate representation being an intermediate representation obtained by converting the piece of analysis target data by the first function;
converts, by a second function, for the piece of analysis target data, a plurality of the acquired anchor data intermediate representations;
calculates, for the piece of analysis target data, the second function that minimizes a difference between the converted plurality of the anchor data intermediate representations; and
converts, by the calculated second function, for the piece of analysis target data, the acquired analysis target intermediate representation.

2. The distributed data integration device according to claim 1, wherein the first function is a function for abstracting data.

3. The distributed data integration device according to claim 1, wherein attributes included in the anchor data include all of attributes included in the plurality of the pieces of analysis target data.

4. A distributed data integration method, comprising:
acquiring, for a piece of analysis target data, an anchor data intermediate representation and an analysis target intermediate representation, the anchor data intermediate representation being an intermediate representation obtained by converting anchor data by a first function, the anchor data being data commonly used in integration of a plurality of the pieces of analysis target data that are distributed, the analysis target intermediate representation being an intermediate representation obtained by converting the piece of analysis target data by the first function;
converting, by the second function, for the piece of analysis target data, a plurality of the anchor data intermediate representations acquired in the acquiring;
calculating, for the piece of analysis target data, the second function that minimizes a difference between the plurality of the anchor data intermediate representations converted in the converting; and
converting, by the second function calculated in the calculating, for the piece of analysis target data, the analysis target intermediate representation acquired in the acquiring.

5. A non-transitory storage medium storing a program causing a computer to implement:
acquiring, for a piece of analysis target data, an anchor data intermediate representation and an analysis target intermediate representation, the anchor data intermediate representation being an intermediate representation obtained by converting anchor data by a first function, the anchor data being data commonly used in integration of a plurality of the pieces of analysis target data that are distributed, the analysis target intermediate representation being an intermediate representation obtained by converting the piece of analysis target data by the first function;
converting, by a second function, for the piece of analysis target data, a plurality of the anchor data intermediate representations acquired in the acquiring;
calculating, for the piece of analysis target data, the second function that minimizes a difference between the plurality of the anchor data intermediate representations converted in the converting; and
converting, by the second function calculated in the calculating, for the piece of analysis target data, the analysis target intermediate representation acquired in the acquiring.

* * * * *